United States Patent
Wright

[15] 3,635,750
[45] Jan. 18, 1972

[54] PHOTOPOLYMERIZED COPOLYMER FILMS

[72] Inventor: Archibald N. Wright, Schenectady, N.Y.
[73] Assignee: General Electric Company
[22] Filed: Dec. 29, 1969
[21] Appl. No.: 888,372

Related U.S. Application Data

[63] Continuation-in-part of Ser. No. 530,950, Mar. 1, 1966, abandoned.

[52] U.S. Cl. ............... 117/93.31, 204/159.22, 117/132 CB, 117/161 UH, 117/161 UN, 260/82.3, 260/83.7
[51] Int. Cl. ........................................ B44d 1/50, C08f 1/18
[58] Field of Search ............... 117/93.31, 93.3; 260/92.3, 260/87.5, 88.7; 204/159.2, 159.22, 159.23, 159.11

[56] References Cited

UNITED STATES PATENTS

| | | | |
|---|---|---|---|
| 3,271,180 | 9/1966 | White | 117/93.31 |
| 3,012,950 | 12/1961 | Anderson | 204/159.22 X |
| 3,058,899 | 10/1962 | Yanko et al. | 204/159.23 X |

*Primary Examiner*—Alfred L. Leavitt
*Assistant Examiner*—J. H. Newsome
*Attorney*—Richard R. Brainard, Paul A. Frank, Joseph T. Cohen, Charles T. Watts, William A. Teoli, Frank L. Neuhauser, Oscar B. Waddell and Joseph B. Forman

[57] ABSTRACT

Copolymer films are provided which are made by the surface photopolymerization of vaporous mixture of a diene such as butadiene and a vinyl monomer, for example acrylonitrile. The copolymer films exhibit valuable insulating properties and have a dielectric constant over the range of from about 2.65 to about 5.9.

5 Claims, 3 Drawing Figures

PATENTED JAN 18 1972

3,635,750

INVENTOR:
ARCHIBALD N. WRIGHT
by William A. Teoli
HIS ATTORNEY

PHOTOPOLYMERIZED COPOLYMER FILMS

This application is a continuation-in-part of my copending application Ser. No. 530,950, filed Mar. 1, 1966, now abandoned and assigned to the same assignee as the present invention.

This invention relates to photopolymerized films, coatings, and products including such films or coatings, and to methods of forming such films, coatings, and products, and more particularly to continuous films, coatings, and products formed by simultaneous ultraviolet surface photopolymerization of two gaseous materials, and to methods of forming such films, coatings, and products.

Thin films, which can be configurationally deposited are desirable for a wide variety of applications. It is further desirable that such thin films and coatings be adhesive to a substrate, and continuous thereon. The present invention is directed to improved thin films, coatings and products having such films or coatings thereon which exhibit the above desirable characteristics and to methods of forming such films, coatings, and products having such films or coatings. The thin films and coatings of the present invention are formed by simultaneous ultraviolet surface photopolymerization of a gaseous diene and of a gaseous vinyl monomer. Such vinyl monomers include, for example, ethylene, methyl methacrylate, styrene, and acrylonitrile.

In addition to being configurationally deposited, continuous and adhesive, the films and coatings formed in accordance with my invention exhibit good chemical resistance, have preselected dielectric constants, are pinhole-free, and exhibit good temperature stability. These films and coatings are useful for a wide variety of applications including capacitor dielectrics, covering layers for various metallic and nonmetallic substrates, cryogenic device insulation, insulation for microelectric devices, as a primer or as insulation on electrically conductive wire, and for corrosion protection.

It is an object of my invention to provide a method of forming a continuous film by simultaneous ultraviolet surface photopolymerization of two gaseous materials.

It is another object of my invention to provide a method of forming in a predetermined pattern such a continuous film.

It is another object of my invention to provide a method of forming a continuous film by simultaneous ultraviolet surface photopolymerization of two gaseous materials in which the substrate is cooled during photopolymerization to increase the rate of film formation.

It is a further object of my invention to provide a method of forming a continuous film on a substrate by simultaneous ultraviolet photopolymerization of two gaseous materials thereby forming a product or composite article.

It is a still further object of my invention to provide a method of forming a continuous coating on a substrate by simultaneous ultraviolet surface photopolymerization of two gaseous materials and removing subsequently the substrate by chemical etching.

In accordance with my invention, a continuous film can be formed by simultaneous ultraviolet surface photopolymerization of a gaseous diene and a gaseous vinyl monomer.

These and various other objects, features and advantages of the invention will be better understood from the following description taken in connection with the accompanying drawing in which.

Figure 1:
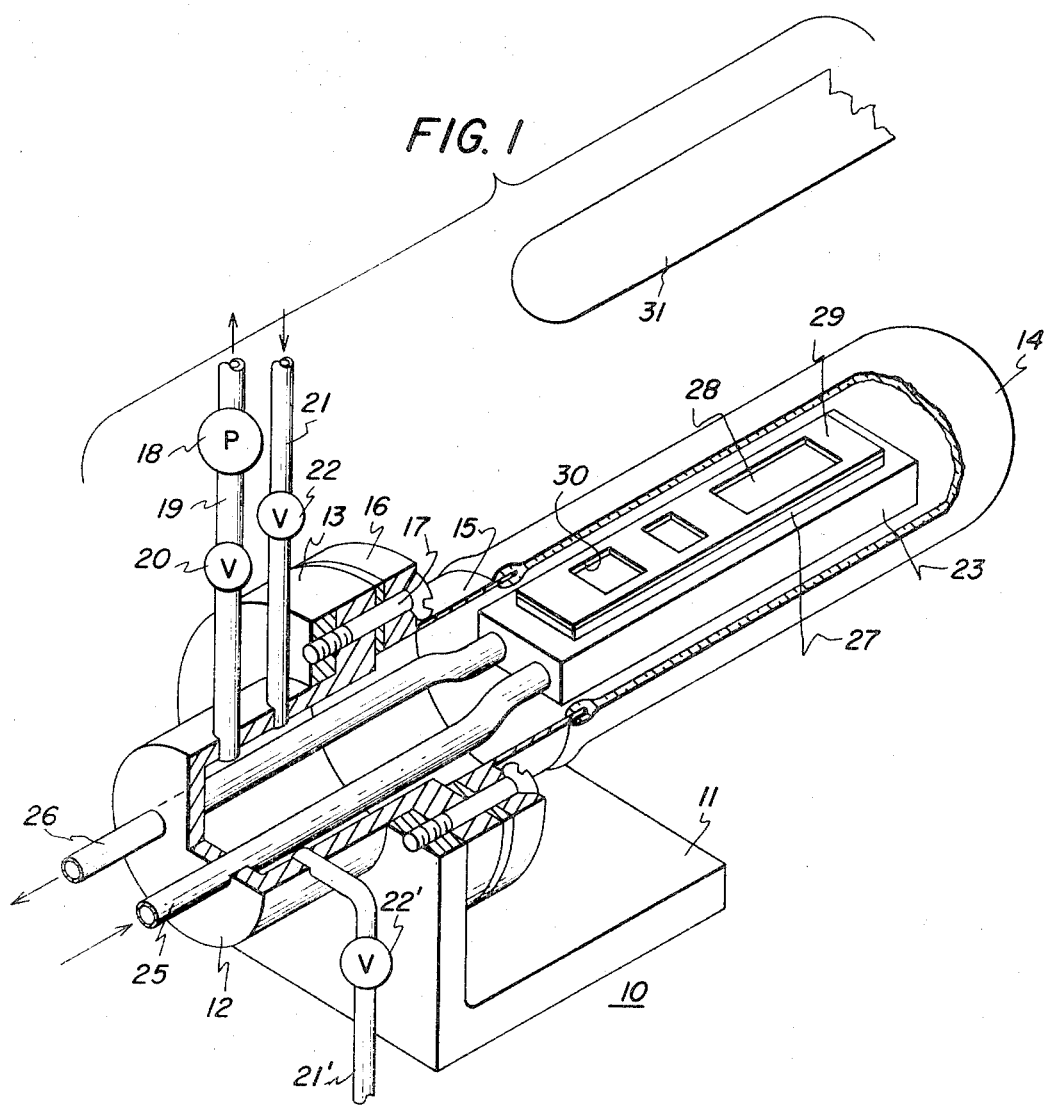
FIG. 1 is a perspective view partially in section of an apparatus for forming films, coatings and products in accordance with my invention.

In FIG. 1 of the drawing, apparatus is shown generally at 10 for forming films, coatings, and products having such films or coatings thereon in accordance with my invention. A base or support surface (not shown) is provided on which is mounted an L-shaped bracket 11 to support an enclosure or chamber 12 having a flange 13 at its open end. A quartz tube 14 is bonded adjacent at its open end by a suitable metal-ceramic seal to a metal cylinder 15 having a flange 16 at its opposite end. Flange 16 is readily threaded to and unthreaded from flange 13 of enclosure 12 by means of a plurality of threaded fasteners 17. A vacuum pump 18 is connected by a line 19 to enclosure 12 to evacuate enclosure 12 and associated quartz tube 14. A control valve 20 is provided in evacuation line 19. An inlet line 21 is connected at one end to enclosure 12 and at its other end to two sources (not shown) of different materials to be supplied in gaseous state to tube 14. A control valve 22 is provided in line 21 to control the supply of material to enclosure 12 and tube 14. If desired, one gaseous material is supplied through inlet line 21 while the second gaseous material is supplied through an inlet line 21′ with a control valve 22′.

A support block 23 of a material such as copper is shown positioned within tube 14. Block 23 has a U-shaped metal tube 24 imbedded therein, two ends 25 and 26 of which extend through cylinder 15, flanges 16 and 13, enclosure 12 and through the wall of enclosure 12. Tube 24 circulates a cooling medium such as ethanol to block 23 and positions the block. The ends 25 and 26 of tube 24 are connected to a heat exchanger or to other cooling equipment. A substrate support 27 is shown positioned on support block 23. Substrate support 27 comprises, for example a 1 inch × 3 inch glass microscope slide on the upper surface of which is a 0.25 micron aluminum film substrate 28. A stainless steel light mask 29, which is shown as the same size as the substrate support 27, is shown also with three slots 30 therethrough to provide formation of predetermined patterned thin films or coatings on the aluminum film substrate. An ultraviolet light 31, which is normally provided with a reflector (not shown), is shown outside and spaced above quartz tube 14 and supported in any suitable manner. Such a light source provides ultraviolet light in a region of about 2,000 to 3,500 angstroms, which is directed by the reflector (not shown) toward the upper surface of aluminum film 28. For example, a Hanovia 700-watt lamp with a reflector will provide this particular light region. A metal enclosure with a door, which is not shown, is positioned around the above apparatus during its operation.

Figure 2:
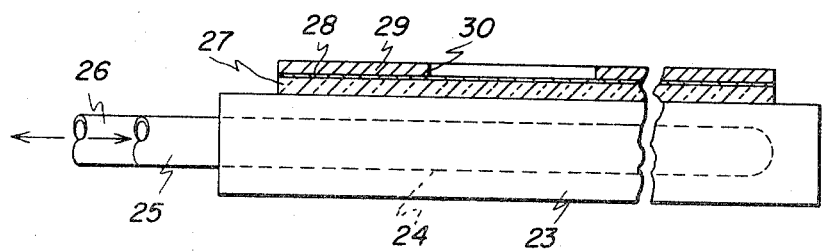
FIG. 2 is an enlarged side elevational view partially in section of a portion of the apparatus shown in FIG. 1.

In FIG. 2 of the drawing, an enlarged side elevational view is shown of support block 23 which was described above in connection with FIG. 1 of the drawing. Block 23 has a U-shaped tube 24 imbedded therein, the two ends 25 and 26 of which circulate a cooling medium to and from block 23, respectively. Substrate support 27 and light mask 29 are shown partially in section to disclose more clearly the aluminum film substrate 28 thereon. While three slots 30 are described for light mask 29, a single slot or a plurality of slots either connected or disconnected may be employed. Masks are also usable which have different configurational patterns.

Figure 3:
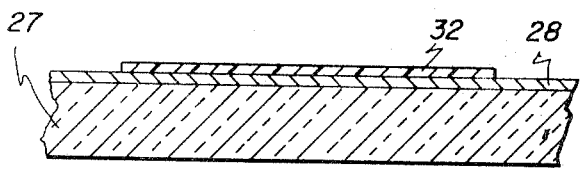
FIG. 3 is a sectional view of a substrate with a thin film thereon formed in accordance with my invention.

In FIG. 3 of the drawing, there is shown a glass substrate support 27 with a 0.25-micron thick aluminum film substrate 28 thereon. A continuous film 32 is shown adhering firmly to the upper surface of the aluminum film 28 in accordance with the method of my invention using the apparatus shown in FIG. 1.

I have discovered unexpectedly that a continuous film could be formed which comprises simultaneously photopolymerizing a gaseous diene and a gaseous vinyl monomer. Such vinyl monomers include ethylene, methyl methacrylate, styrene, and acrylonitrile on the surface of a substrate member with ultraviolet light having an effective wavelength preferably in the range of 2,000 to 3,500 angstroms at a vapor pressure for the gaseous material in the range of from 3 to 4 millimeters of mercury. I have also found that these continuous films are pinhole-free. I have discovered that further advantages can be derived by cooling the substrate during the formation of the film thereon thereby increasing the rate of film formation. I have found further that subsequent to the formation of the above type of continuous film formed on the substrate, the substrate could be removed, for instance, by chemical etching with hydrochloric acid or hydrofluoric acid, thereby providing an unsupported body of the film.

I found further that the simultaneous ultraviolet surface photopolymerization or copolymerization of the above gaseous materials provides a great advantage in that a vinyl monomer embodying particular selected properties can be incorporated into a continuous film of considerable structural strength produced as a result of crosslinking of diene units present in the chain. For example, styrene provides an aromatic group resulting in relative stability while methyl methacrylate provides a polar function.

The dielectric constant of the continuous film depends upon the monomer employed to produce the film. In this manner, you are restricted to fixed values if you use different monomers. I found that intermediate values for the dielectric constant were secured when I mixed these diene and vinyl monomers. Thus, I can preselect the dielectric constant for the resulting film. In microelectric apparatus this could be a distinct advantage.

Thin films, which are formed from styrene alone, are not pinhole-free. However, when I formed films from a gaseous styrene and a gaseous butadiene composition, these films were pinhole-free. While acrylonitrile provides a pinhole-free thin film with a high dielectric constant, I found that I increased greatly the rate of deposition for an acrylonitrile-butadiene mixture over the rate for either monomer alone.

In an illustrative operation of the apparatus shown in FIG. 1 of the drawing, a substrate support 27 in the form of a 1 inch × 3 inch glass microscope slide with a 0.25-micron thick aluminum film substrate 28 thereon was positioned on copper support block 23. A stainless steel light mask 29 of dimensions 1 inch × 3 inches with three slots therein was placed on the upper surface of the aluminum film substrate 28 thereby covering film substrate 28 except for slots 30. Quartz tube 14 was then attached by its flange 16 to flange 13 to enclosure 12 by means of threaded fasteners 17. Vacuum pump 18 was started and pumped down the chamber defined by tube 14, cylinder 15, and enclosure 12 to a pressure of about 1 micron of mercury. Valve 20 was then closed. A diene, such as for example, 1,3-butadiene, 1,5-hexadiene or 2,4-hexadiene, was supplied from a liquid source (not shown) through line 21 in a gaseous state to enclosure 12 whereby it was fed into the interior of quartz tube 14. A vinyl monomer was supplied from a liquid source (not shown) through line 21' in a gaseous state to enclosure 12 whereby it was fed into the interior of quartz tube 14. Each of the above materials is initially retained in its liquid state by maintaining its temperature below room temperature which is accomplished by employing a cooling bath surrounding the liquid materials. The liquids are all maintained at a vapor pressure in the range of 3 to 4 millimeters of mercury by the temperature of the cooling bath whereby its introduction from the source to the inlet line is in a gaseous state. Ultraviolet lamp 31 was positioned above quartz tube 14 and spaced approximately 2 inches from the upper surface of aluminum film 28. The lamp has an effective wave length in the range of 2,000 to 3,500 angstroms.

The monomers were introduced into quartz tube 14 and the pressure rose. A metal hood (not shown) is positioned around apparatus 10 since an ultraviolet light source is used. Lamp 31 is turned on. After a period of time, lamp 32 was shut off, monomer valve 22 was closed, and the system was pumped down to about 2 microns pressure to remove all byproducts. The metal hood was removed and the vacuum was then broken. Tube 14 was cooled to room temperature and disconnected by unthreading fasteners 17 which held its associated flange 16 to flange 13. After tube 14 was removed, metal light mask 29 was removed and substrate support 27 was picked up and examined. A continuous film had been formed on aluminum film substrate 28 which was pinhole-free.

While it is stated above in the operation of the apparatus of FIG. 1, that an aluminum film substrate was employed for the formation thereon of a continuous film formed from the gaseous material, many other metallic and nonmetallic substrates in various forms and configurations can be employed in the process. For example, such a film is formed on metallic substrates including lead, niobium, copper, gold, steel, iron, brass, and aluminum. Various nonmetallic materials are employed such as glass, quartz, mica, carbon, diamonds and borazon.

Examples of films, coatings and products including such films and coatings embodying my invention and methods of making such films and coatings and products including such films and coatings in accordance with my invention are set forth below:

EXAMPLE 1

Apparatus was set up in accordance with FIG. 1 of the drawing. A substrate support, a microscope glass slide 1 inch × 3 inches, which was provided with a 0.25-micron thick aluminum film substrate thereon, was positioned on the copper support block. A stainless steel light mask 1 inch × 3 inches and having three slots therein was placed on the surface of the aluminum substrate. The quartz tube was positioned around the support block by threading its flange to the flange of the enclosure to which the gaseous materials supply lines and vacuum pump were connected. An ultraviolet light source, in the form of a Hanovia 700-watt lamp with a reflector was positioned above the quartz tube and spaced about 2 inches from the upper surface of the aluminum film substrate. The system was pumped down to a pressure of 1 micron of mercury and the control valve was closed. Butadiene and styrene were maintained at their sources (not shown) in liquid form by positioning in separate cooling baths. Butadiene was introduced in the gaseous state at an initial pressure of 4 millimeters of mercury into the quartz tube by opening the control valve in the respective inlet line. The control valve was then closed. Styrene was then introduced in the gaseous state at a partial pressure of 4 millimeters of mercury into the quartz tube by opening the control valve in the respective control valve. Both of these monomers were introduced in initial equimolar concentrations. A metal hood was positioned around the apparatus. The lamp, which had an effective wave length in the range of from 2,000 to 3,500 angstroms, was turned on. Butadiene and styrene in gaseous state were present in the quartz tube under the above light for a period of 5 minutes. In this operation, a film was formed on the aluminum film substrate by simultaneous ultraviolet surface photopolymerization of gaseous butadiene and styrene.

While it is not shown in the drawing, a plurality of thermocouples was provided to measure the temperature of the substrate and of the surface of the evaporated aluminum film to provide temperature information. Cooling means for the substrate as shown in FIG. 1 of the drawing and described above were employed thereby maintaining an average temperature of the substrate at 73° C. The process was concluded by discontinuing the supply of gaseous butadiene and styrene, turning off the ultraviolet light source, removing the hood, opening the vacuum pump control valve, and pumping down the interior of enclosure 12 and tube 14 to a pressure of about 1 micron to remove gaseous material and any byproducts therefrom. The vacuum was then broken and the quartz tube was removed by unthreading its flange from the enclosure flange. The light mask was removed and the aluminum film on the glass substrate was examined. Visual examination disclosed three separate thin films, each of which was continuous. The film was measured by capacitance and interferrometric techniques and found to have an average thickness of 200 angstroms. Thus, the growth rate was 40 angstroms per minute. The film was further tested and its breakdown strength was determined to be 5.8 volts DC at 220 angstroms. The dielectric constant for this film was 2.7, while the dielectric constant for a film from butadiene is 2.65 and for a film from styrene is 2.8. It will be appreciated by those skilled in the art that a change in the concentration varies the dielectric constant.

Thus, a product was obtained from this example which comprised a glass base with an aluminum film substrate thereon on which a continuous, pinhole-free thin film adhered to the upper surface of the substrate.

EXAMPLES 2-3

In the following examples, the same apparatus, substrate, materials and procedures were followed as in example 1. Table 1 sets forth below the example number, the time of film formation in minutes, the average substrate temperature in degrees Centigrade, the average film thickness in angstroms, the growth rate of the film in angstroms per minute, and the breakdown strength of the film in volts direct current. Each of the films was continuous.

TABLE 1

| Example Number | Time (min.) | Average substrate temp., °C. | Average film thickness, A. | Growth rate, A./min. | Breakdown strength, volts D.C. | Dielectric constant |
|---|---|---|---|---|---|---|
| 2 | 15 | 81 | 1,040 | 69 | 14.0 at 1,040 A | 2.7 |
| 3 | 30 | 89 | 2,510 | 84 | 15.0 at 2,510 A | 2.7 |

EXAMPLES 4-6

In the following examples, the same apparatus, substrate, and procedures were followed as in example 1. Butadiene and acrylonitrile were employed in initial equimolar concentrations. The dielectric constant for a film from acrylonitrile is 5.9. Table 2, which has similar headings to table 1, sets forth below these examples. Each of these films was continuous.

TABLE 2

| Example Number | Time (min.) | Average substrate temp., °C. | Average film thickness, A. | Growth rate, A./min. | Breakdown strength, volts D.C. | Dielectric constant |
|---|---|---|---|---|---|---|
| 4 | 5 | 44 | 2,500 | 500 | 16.5 | ~5.6 |
| 5 | 10 | 58 | 7,500 | 750 | 20.0 | ~5.6 |
| 6 | 15 | 34 | 10,000 | 670 | 10.0 | ~5.6 |

EXAMPLES 7-9

In the following examples, the same apparatus, substrate, and procedures are followed as in example 1. The monomers were introduced in initial equimolar concentrations. The dielectric constants for methyl methacrylate, 1,5-hexadiene, and 2,4-hexadiene are approximately 3, 3 and 4, respectively. Table 3, which has similar headings to tables 1 and 2, set forth below these examples. Each of the films is continuous. The dielectric constants of examples 7, 8 and 9 are approximately 2.8, 5.5 and 3, respectively.

TABLE 3

| Example no. | Monomers | Time Minutes | Average Substrate Temp. °C. |
|---|---|---|---|
| 7 | butadiene, methyl methacrylate | 15 | 70 |
| 8 | 1,5-hexadiene, acrylonitrile | 10 | 60 |
| 9 | 2,4-hexadiene, styrene | 15 | 80 |

| Example no. | Average film Thickness A. | Growth rate A./minute | Breakdown Voltage Volts, DC |
|---|---|---|---|
| 7 | 1,500 | 100 | 30 |
| 8 | 7,000 | 700 | 5 |
| 9 | 13,500 | 900 | 120 |

EXAMPLE 10

Styrene films having thicknesses of 530 Angstroms and 2,560 Angstroms, respectively, were made by UV surface photopolymerization of styrene in accordance with the method illustrated by example 1. The styrene was surface photopolymerized at a pressure of about 4 torr, while maintaining a substrate temperature below 100°C., to provide for a satisfactory growth rate. In addition, butadiene-styrene copolymer films having thicknesses of about 200 Angstroms and 1,040 Angstroms respectively also were made utilizing substantially the same conditions from an equal molar mixture of styrenebutadiene.

The various films were then evaluated as dielectric layers by the same procedure. A mobile mercury drop electrode was employed to determine breakdown voltage. Table 1 shows the results obtained, where "Styrene" indicates the styrene film, "Copolymer" indicates the butadiene-styrene copolymer and "A" indicates thickness in Angstroms:

TABLE 4

| | A | Breakdown strength |
|---|---|---|
| Styrene | 530 | Shorted |
| | 3,560 | Shorted in spots* |
| Copolymer | 200 | $>1\times10^6$ volts/cm. |
| | 1,040 | $>1\times10^6$ volts/cm. |

*resistance less than $<3\times10^4$ ohms overall

EXAMPLE 11

In accordance with the procedure of example 10, there were made butadiene films having thicknesses of 3,100 Angstroms and 7,500 Angstroms respectively, and a butadiene-acrylonitrile copolymer film having a thickness of 4,300 Angstroms. The films were made by the UV surface photopolymerization of the corresponding aliphatically unsaturated material, utilizing a pressure of about 4 torr and a substrate surface temperature below about 100° C. The capacitances of the butadiene films and the butadiene-acrylonitrile copolymer films were measured in accordance with the mercury drop technique. All of the films were found to be pinhole-free and useful as dielectric materials. The various films were then subjected to an accelerated atmospheric moisture test by exposing them to steam arising from boiling water in a beaker at a point about 3 inches above the top of a beaker. After a 10 second exposure, the various films were then measured for capacitance following the same technique employed before being subjected to the accelerated moisture test.

Table 5 below shows the results obtained, where "Butadiene" indicates the butadiene films, "Copolymer" indicates the butadiene-acrylonitrile films, "Capacitance" is expressed in Farads, and "Before" and "After" is expressed with respect to exposure to steam.

TABLE 5

| A. | Capacitance Before | After |
|---|---|---|---|
| Butadiene | 3,100 | $7.8\times10^{-10}$ | Shorted |
|  | 7,500 | $3.2\times10^{-10}$ | Shorted |
| Copolymer | 4,300 | $11.5\times10^{-10}$ | $11.0\times10^{-10}$ |

In addition to the above showing, the copolymer films were found to be substantially unchanged after a visual examination of the films was made. After the steam test, the butadiene films were considerably degraded and portions of the film were actually flaking off from the substrate.

Based upon the results shown in examples 10 and 11, one skilled in the art would know that the copolymer films are, in many respects, superior to the respective homopolymer films derived from ingredients used in making the copolymer films.

While other modifications of the invention and variations of method which may be employed within the scope of the invention have not been described, the invention is intended to include such as may be embraced in the following claims.

I claim:

1. A continuous pinhole-free film having a thickness of from about 200 Angstroms to 13,500 Angstroms, said film being the ultraviolet surface photopolymerized product of a mixture of butadiene and a gaseous vinyl monomer from the group consisting of styrene and acrylonitrile.

2. A composite of the film of claim 1 and a metallic substrate.

3. A composite of the film of claim 1 and a nonmetallic substrate.

4. A continuous pinhole-free film in accordance with claim 1 where the vinyl monomer is styrene.

5. A continuous pinhole-free film in accordance with claim 1 where the vinyl monomer is acrylonitrile.

* * * * *